United States Patent [19]

Greinke et al.

[11] Patent Number: 5,228,701

[45] Date of Patent: Jul. 20, 1993

[54] FLEXIBLE GRAPHITE ARTICLES WITH AN AMORPHOUS CARBON PHASE AT THE SURFACE

[75] Inventors: Ronald A. Greinke, Medina; Ronald A. Howard, Brook Park, both of Ohio

[73] Assignee: UCAR Carbon Technology Corporation, Danbury, Conn.

[21] Appl. No.: 590,582

[22] Filed: Sep. 28, 1990

Related U.S. Application Data

[63] Continuation of Ser. No. 171,663, Mar. 22, 1988, abandoned.

[51] Int. Cl.⁵ .............................................. F16J 15/30
[52] U.S. Cl. .................................. 277/102; 277/112; 277/123; 277/125; 277/227; 277/237 R; 277/DIG. 6; 264/291; 264/335; 427/227; 427/228; 428/244; 428/408
[58] Field of Search ............... 277/102, 112, 123, 125, 277/227, 237 R, DIG. 6; 427/227, 228; 428/408, 244; 264/291, 335

[56] References Cited

U.S. PATENT DOCUMENTS

| | | | |
|---|---|---|---|
| 3,404,061 | 10/1968 | Shane et al. | 428/408 X |
| 3,661,401 | 5/1972 | Farnam | 277/227 |
| 3,914,508 | 10/1975 | Hooton et al. | 428/408 |
| 4,068,853 | 1/1978 | Schnitzler | 277/204 X |
| 4,082,300 | 4/1978 | Harbeck et al. | 277/123 |
| 4,169,185 | 9/1979 | Bhatia | 277/235 B X |
| 4,178,413 | 12/1979 | De Munda | 428/408 |
| 4,190,257 | 2/1980 | Schnitzler | 277/102 |
| 4,279,952 | 7/1981 | Kodama et al. | 428/408 X |
| 4,321,298 | 3/1982 | Shaffer et al. | 428/408 X |
| 4,391,873 | 7/1983 | Brassell et al. | 428/408 X |
| 4,456,645 | 6/1984 | Chi | 428/408 X |
| 4,483,539 | 11/1984 | Bindel et al. | 277/235 B X |
| 4,490,828 | 12/1984 | Fukuhara et al. | 219/553 X |
| 4,526,911 | 7/1985 | Boxall et al. | 523/445 |
| 4,643,956 | 2/1987 | Sandelli et al. | 429/34 |
| 4,759,977 | 7/1988 | Fukuda et al. | 428/408 X |
| 4,826,181 | 5/1989 | Howard | 277/112 |

FOREIGN PATENT DOCUMENTS

| | | | |
|---|---|---|---|
| 2053829 | 4/1971 | France | 277/235 B |
| 52-11354 | 1/1977 | Japan | 277/235 B |
| 551311 | 5/1977 | U.S.S.R. | 428/408 |
| 1018438 | 1/1966 | United Kingdom | 427/227 |

*Primary Examiner*—William A. Cuchlinski, Jr.
*Attorney, Agent, or Firm*—F. J. McCarthy

[57] ABSTRACT

An article, such as a seal ring, suitable for reduction of chatter when used in stuffing boxes with reciprocating stems. The article has an amorphous carbon phase at the surface of the article with the amorphous carbon phase extending into the article from the surface.

25 Claims, 2 Drawing Sheets

FLEXIBLE GRAPHITE ARTICLES WITH AN AMORPHOUS CARBON PHASE AT THE SURFACE

This application is a continuation of prior U.S. application Ser. No. 171,663 filed Mar. 22, 1988, now abandoned.

FIELD OF THE INVENTION

The present invention relates to flexible carbon seal rings for seals around reciprocating valve stems and pump shafts.

BACKGROUND OF THE INVENTION

Flexible graphite has been successfully used as a packing material in fluid handling devices, such as pumps and valves, to provide a seal where a reciprocating stem or shaft enters the device. Commonly the flexible graphite is in the form of preformed annular rings which are placed around the stem in a stuffing box and compressed. For example, U.S. Pat. No. 4,190,257 discloses packing rings of flexible graphite particles compressed together into annular seal rings. Packing seal rings of flexible graphite may also be formed by wrapping a flexible graphite tape about a shaft to form an annular shaped article and compressing the article in a die.

Flexible graphite seal rings, since they are essentially pure carbon, are chemically inert and stable at high temperatures. In addition, the resilience of the flexible graphite allows for very effective seals. Because of these qualities, flexible graphite is a preferred packing material in high temperature and corrosive environments.

However, packings with flexible graphite seal rings are prone to produce "chatter" when used as seals for reciprocating valve stems, Particularly at temperatures less than about 1100° F. (600° C.). Chatter is an erratic slip-stick motion of the stem as it passes through the packing. It is a common phenomenon. Particularly in applications where little force is being applied to the stem to move it through the packing or where precise control is required. Such applications include pneumatically controlled valves wherein a diaphragm or piston actuates a reciprocating stem. Because of chatter, precise control of such valves is difficult or impossible.

Chatter can be reduced by applying a lubricious material on the surface of the stem, such as water. Petroleum derivatives, or the like. However, these materials generally provide only a temporary solution as they often volatilize or degrade, particularly when the valve is subject to high temperatures. The loss of the lubricious material then results in the return of the chatter of the stem.

OBJECTS OF THE INVENTION

An object of the invention is to provide flexible graphite seal rings that effectively reduce chatter when used in conventional stuffing boxes.

Another object of the invention is to provide seal rings with a permanent surface that reduces chatter when used in a conventional stuffing box and does not degrade or volatilize at high temperatures.

Another object of the invention is to provide flexible graphite seal rings that will reduce chatter in a conventional stuffing box wherein the chemical inertness and high temperature stability of the seal rings is not compromised.

SUMMARY OF THE INVENTION

An embodiment of the invention is an article comprising flexible graphite with a continuous amorphous carbon phase on a surface of the article, the amorphous carbon phase extending from said surface into the interior of the article. The amorphous carbon surface, i.e. the surface with the amorphous carbon phase, is typically adapted to bear against a moving stem to provide a chatter-free seal. In a preferred embodiment, a lubricious material is applied over the amorphous carbon surface.

Another embodiment of the invention is a method for manufacturing a flexible graphite article with an amorphous carbon surface comprising:

(a) compressing exfoliated graphite flakes into an article having a density between 0.05 and 2.0 g/cm$^3$, preferably g/cm$^3$ between 0.05 and 1.5 g/cm$^3$, more preferably between 0.1 and 0.5 g/cm$^3$;

(b) applying a coke forming organic material upon a surface of the article; and (c) subjecting the article to a temperature sufficient to coke the organic material to form an amorphous carbon phase upon the surface of the article.

The amorphous carbon phase is continuous at the surface, i.e. there is an uninterrupted path through the amorphous carbon phase at the surface. However, the continuous amorphous carbon phase may contain small islets of one or more compressed flexible graphite flakes dispersed throughout the amorphous carbon at the surface. Thus, the surface may comprise a continuous amorphous carbon phase and flexible graphite, or comprise the continuous amorphous carbon phase with no flexible graphite present. For simplicity, reference to the "amorphous carbon surface" shall refer herein to any surface of an article of the invention which has an amorphous carbon phase at the surface, even though there may also be flexible graphite at the same surface.

The amorphous carbon phase extends from the surface into the interior of the flexible graphite article. The volume fraction of the amorphous carbon phase is greatest at the surface and diminishes as the amorphous carbon phase extends into the interior of the article, with no distinct phase boundary between the amorphous carbon phase and the flexible graphite. Typically the amorphous carbon phase extends into the flexible graphite article about 5 mils (0.13 mm), although this will vary, depending on the penetration of the coke forming organic material, which may be in turn affected by the wetting and viscosity properties of the coke forming organic material, the density of the flexible graphite, and other factors.

Because of the penetration of the amorphous carbon phase into the interior, wear or attrition of the amorphous carbon surface presents new amorphous carbon at the surface, so there continues to be an amorphous carbon phase on the surface. Accordingly, the articles of the invention provide an amorphous carbon surface that will not quickly wear off or degrade with use. For a seal ring for a reciprocating stem, the amorphous carbon phase on the surface does not flake off or significantly degrade with use, and provides chatter-free operation for periods much longer than was possible with prior seals. The amorphous carbon phase provides an essentially chatter-free, wear resistant bearing surface for the reciprocating stem, whereas the flexible graphite provides the resiliency to form a seal against passage of fluids.

The amorphous carbon phase is predominately non-crystalline carbon formed by carbonization or coking of the organic material. However, it is understood that the amorphous carbon phase may be partially crystalline, and contain ordered or partially graphitic molecular structures.

The articles of the invention with an amorphous carbon surface can be formed by first compressing exfoliated graphite flakes into a flexible graphite article, preferably a sheet, to a density between 0.05 and 2.0 g/cm$^3$. The density should be sufficiently high to provide adequate strength of the article for handling, but is preferably as low as possible to assist penetration of the organic material when it is applied. The preferred densities are less than 1.5 g/cm$^3$, more preferably between 0.1 and 0.5 g/cm$^3$.

Exfoliated graphite flakes from which the flexible graphite article are formed are graphite flakes which have been treated with an intercalating agent, such as a mixture of sulfuric and nitric acid, and exposed to a high temperature, for example about 1000° C., to cause the flakes to expand in the c-direction. Flexible graphite is a material consisting essentially of graphite formed by compressing exfoliated graphite flakes into a coherent shape or article, preferably a sheet. Production of exfoliated graphite flakes and the production of flexible graphite therefrom is disclosed in U.S. Pat. No. 3,404,061, which is hereby incorporated by reference.

After formation of the flexible graphite article, a coke forming organic material is then applied to its surface. By "coke forming" is meant the ability to form amorphous carbon when the material is subjected to elevated temperatures. When the organic material is applied to the surface, the organic material should penetrate into the article from the surface. When the organic material is thereafter coked, an amorphous carbon phase is formed that extends from the surface into the interior of the object, and provides a surface with a continuous phase of amorphous carbon.

Penetration of the organic material into the surface of the flexible graphite article can be achieved by applying the organic material as a liquid with a sufficiently low viscosity. Alternately, the organic material may by applied as a solid or viscous liquid, and heated, or treated with a solvent, to soften or liquify the organic material and cause penetration of the organic material into the surface.

If the organic material is a thermosetting resin, the article may be subjected to conditions to cure the organic material. Curing may not be required if carbonization of the organic material results in a satisfactory amorphous carbon phase.

After application of the organic material, the article may be further compressed to a higher density to increase strength of the article and ease further handling of the article.

The treated article is then heated to a temperature sufficient to coke the organic material and form an amorphous carbon phase. For most applications, the organic material should be carbonized at a temperature higher than the temperature to which the article will be exposed during use. For most organic materials, carbonizing in a non-oxidizing atmosphere between 450° C. and 1000° C. is suitable.

In a preferred method of the invention, a lubricious material is applied upon the top of the amorphous carbon phase. The lubricious material may be any material with lubricious properties which is compatible with flexible graphite and amorphous carbon. While almost any liquid provides some lubricity, preferred materials are those which are stable under the environmental conditions to which the article may be subjected. In addition, the lubricity should preferably not degrade significantly during use. Suitable lubricious materials include liquid organic and inorganic lubricants.

Preferably the article of the invention is an annular seal ring of flexible graphite, with the amorphous carbon surface corresponding to the inner cylindrical surface of the seal ring which faces inwardly, and which is the surface adapted to bear against a stem to provide a seal against fluid leakage. A seal ring may be produced by any suitable method, such as wrapping flexible graphite sheet around a shaft with the amorphous carbon surface towards the shaft and axially compressing the resulting annular shaped article.

By use of seal rings of the invention, chatter can be significantly reduced or eliminated. A seal ring of the invention with an amorphous carbon surface which has been treated with a lubricious material is the most effective in reducing chatter and typically does not require a break-in period. Usually amorphous carbon surfaces which have not been treated with a lubricious material significantly reduce chatter, with chatter being completely eliminated after a break-in period.

The amorphous carbon surface of the seal ring of the invention, is carbon as is the flexible graphite, and therefore, retains its anti-chatter properties at high temperatures. Accordingly, the seal rings of the invention may be used for fire safe valves, that is valves that will function after being subjected to high temperatures. The optional lubricious materials applied to the amorphous carbon surface are generally lost at elevated temperatures, so there may be a slight loss in the anti-chatter property at high temperatures for amorphous carbon surfaces treated with a lubricious material. In general the lubricious material contributes to eliminating chatter up to the point the lubricious material breaks down or volatilizes, about 225° C. for ferric stearate, and about 250° C. for polytetraflouroethylene. The amorphous carbon surface provides chatter reduction after being exposed to temperatures as high as 450° C. in air, and 3000° C. in non-oxidizing environments.

It is preferable to treat the amorphous carbon surface with a lubricious material, even if the article may be subjected to temperatures sufficient to remove the lubricious material. It has been found that treatment of the amorphous carbon surface with a lubricious material significantly reduces the break-in time of the surface. For a new seal ring of the invention with an untreated amorphous carbon surface, there is a slight chatter which continues over several hundred cycles before disappearing. In contrast, if the amorphous carbon surface of a new seal ring is treated with a lubricious material, chatter is usually eliminated beginning with the first cycle. After a break-in of about a hundred cycles, the seal ring will usually remain chatter free, even if the lubricious material is volatilized, leaving only the amorphous carbon surface.

The articles of the invention having an amorphous carbon surface may be used where chatter or a related phenomenon is a problem. Possible applications are as seal rings in packings for control valves, reciprocating metering pumps, or the like, where precise control is required.

DESCRIPTION OF THE INVENTION

Figure 1A:
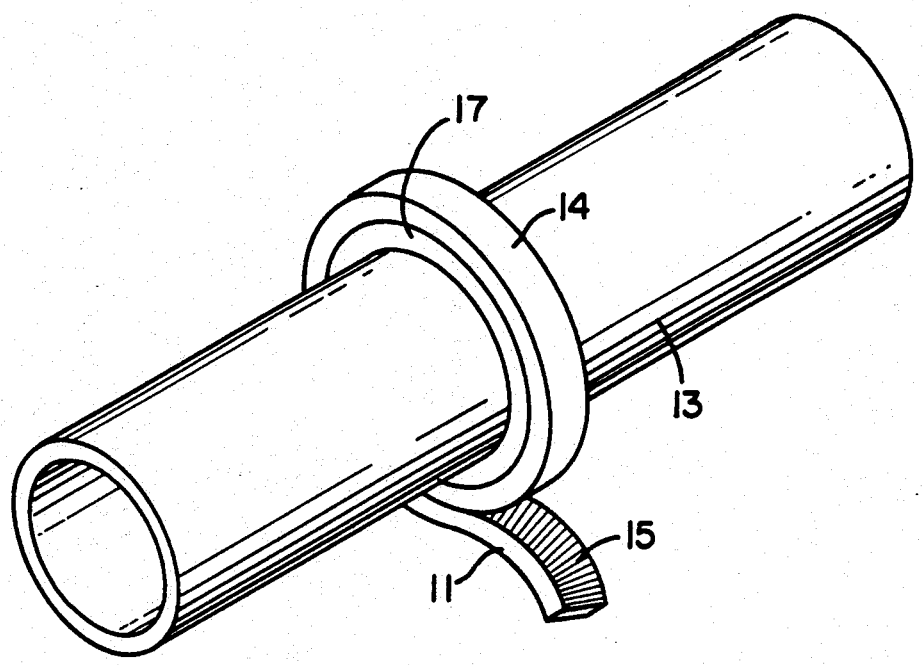
FIG. 1a illustrates a method of manufacture of a seal ring from flexible graphite foil with an amorphous carbon surface.

Suitable coke forming organic materials as precursors to the amorphous carbon phase are organic materials capable of being coked, or those capable of forming amorphous carbon, when subjected to elevated temperatures. Examples include thermosetting and thermoplastic resins such as phenolic resins, prepolymerized furfuryl alcohol, and pitches. Preferred materials are those with high coke yield, greater than about 40 wt. %, such as phenolic-based thermosetting resins as used in the examples below, and pitches containing polynuclear hydrocarbons. In general, the organic material must be capable of being applied upon a surface of the flexible graphite article by any suitable method and capable of penetrating the surface. The organic material may be applied as liquid, or as solid particles which have been softened or liquefied by heat or a solvent to allow penetration, or applied dissolved in a liquid solvent and thereafter volatilizing the solvent.

A preferred method of applying the organic material is to sprinkle solid particles, such as a phenolic resin, upon the surface, and then spraying the surface with a solvent to soften and partially liquify the particles. Preferably, the surface of the flexible graphite article is embossed with small indentations to aid in dispersion of the solid particles over the surface. This can be accomplished during formation of the flexible graphite article by compressing the exfoliated graphite flakes with a device having a compression surface of coarse woven cloth, or the like, to emboss the surface of the compressed flexible graphite with uniform indentations.

If the organic material is a thermosetting resin, the resin may be optionally cured before the coking step. However, curing may not be required to obtain a satisfactory amorphous carbon phase.

The flexible graphite article may be further compressed, Preferably to a density less than 2.0 g/cm$^3$, after application of the organic material, and after curing if a thermosetting resin is used, to provide more strength for further handling of the article. In addition, after coking of the organic material and after application of any lubricious material, the flexible graphite article is preferably further compressed to a final density between about 0.5 g/cm$^3$ and 2.0 g/cm$^3$, preferably between about 0.8 g/cm$^3$ and 1.6 g/cm$^3$.

The amorphous carbon phase is typically present in the article of the invention in an amount between about 0.1 to about 75 wt. % of the combined weight of the flexible graphite and the amorphous carbon. The exact weight depends in large part on thickness of the article and the proportion of the amorphous carbon surface to the total surface of the article. Too small an amount will not provide sufficient amorphous carbon phase upon the surface to provide suitable anti-chatter properties. Too large an amount will provide insufficient flexible graphite for the article to have adequate resiliency to form a seal. The amount of amorphous carbon can be varied by altering the amount and type of organic material. For articles in the form of flexible graphite sheets less than about 20 mils (0.5 mm) thick with one amorphous carbon surface, the amount of amorphous carbon is typically between 10 wt. % and 25 wt. %, based on the total weight.

Suitable lubricious materials include any material with a lubricious property such as organic lubricants, in particular those comprising hydroxyl-containing polymers. Suitable lubricious materials include, for example, long chain alcohols, such as dodecanol, fatty acids and their iron derivatives, such as stearic acid, arachidic acid, ferric stearate, and iron arachidate, polyethers, polyethylene glycols, silicone oils (i.e silicones), such as polydimethyldiphenylsiloxane, and fluorinated hydrocarbon polymers, such as polytetrafluoroethylene (PTFE). Preferred lubricious materials are PTFE and ferric stearate.

Liquid lubricious materials may be applied by painting, spraying, or any suitable technique. Solid lubricious materials may be applied as powder by sprinkling upon the article surface and heating to fuse or melt the material, or dissolving the lubricious material in a solvent, spraying or painting the solution over the surface, and volatilizing the solvent. For example, ferric stearate can be applied by sprinkling upon the surface and melting by heating to about 100° C. or above, or by dissolving the ferric stearate in toluene or carbon tetrachloride and painting or spraying the liquid solution upon the surface. In general, any coating method which applies a reasonably uniform layer is suitable.

The article of the invention is preferably an annular shaped seal ring wherein the cylindrical surface facing inwardly, the surface which is adapted to contact a stem, is the surface with the amorphous carbon phase. A seal ring may be made from a flexible graphite sheet made according to the invention with at least one surface with an amorphous carbon phase. Preferably, the surface has been treated with a lubricious material. The seal ring is produced by cutting a tape from the sheet and wrapping the tape around a shaft to produce an annular ring-shaped article with the tape arranged in a spiral fashion. To ease the rolling of the tape, the sheet is preferably previously compressed to a thickness of about 15 mils (0.38 mm) or less. The surface of the tape with the amorphous carbon phase is placed against the shaft such that the inner annular surface of the ring is the surface with the amorphous carbon phase. The resulting annular shaped article is then placed into a die mold and compressed to form a seal ring, preferably to a density between 1.3 g/cm$^3$ and 1.6 g/cm$^3$.

Figure 1B:
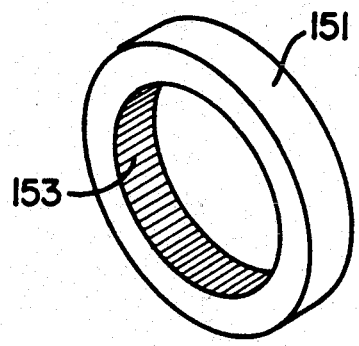
FIG. 1b is a perspective view of a seal ring of the invention.

Referring to FIGS. 1a and 1b, which illustrate a seal ring the invention produced in the manner described above. Referring to 1a, a flexible graphite tape 11 is wrapped around a shaft 13 in a spiral fashion to form an annular, article 14. The flexible graphite tape 11 has an amorphous carbon surface 15 and is wrapped around the, shaft 13 such that the amorphous carbon surface 15 is placed adjacent to the shaft 13. The thickness of the tape 11 in the figure is exaggerated for illustration purposes. The amorphous carbon surface 15 of the flexible graphite tape 11 may only correspond to that portion which is adjacent to the shaft, or the amorphous carbon surface 15 of the tape 11 may extend along its entire length such that its amorphous carbon surface 15 extends in a spiral 17 throughout the annular article 14, as illustrated.

Referring to FIG. 1b, the resulting article is compressed in a die to form an annular shaped seal ring 151 with an inner cylindrical surface 153 of amorphous carbon.

Figure 2:
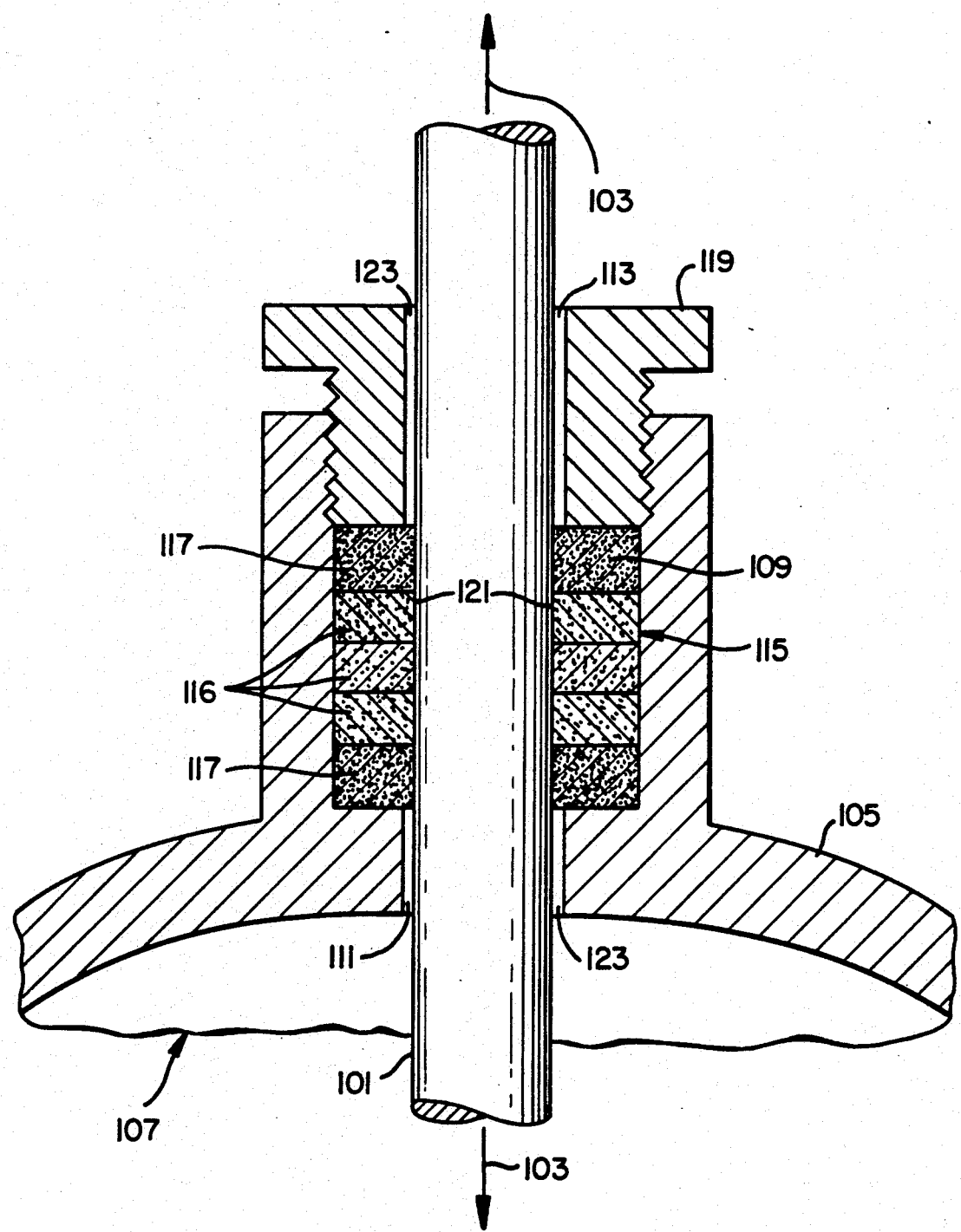
FIG. 2 is a simplified cross-sectional view of a stuffing box incorporating seal rings of the invention.

FIG. 2 illustrates the preferred use of the invention as a seal ring in a packing for a reciprocating shaft. Reciprocating stem 101 (as shown be the arrows 103) passes through an outer wall 105 of a fluid handling device 107, such as a control valve, through a first aperture 111 into a container means or stuffing box 109, and out of the stuffing box 109 through second aperture 113. The stuffing box 109 contains a packing 115 comprising one or more seal rings 116 of the invention. A compression means, illustrated here as a threaded packing gland nut 119, is threaded down to compress the packing material 115, and conform the packing material 115 to the internal space of the stuffing box 109. The compression also forces the amorphous carbon surface 121 of the seal rings against the surface of the stem 11, forming a seal against the passage of fluid. Annular end rings 117 may be optionally placed around the stem 101 between the packing material 115, and each of the apertures 111. 113 to prevent extrusion of the seal rings 116 through the clearances 123 between the stem 101 and the edges of the apertures 111, 113, which results from compression of the packing 115. The end rings may be of conventional design, such as end rings of braided carbon or graphite fibers, or may be end rings as disclosed in U.S. application Ser. No. 154,034 filed Feb. 9, 1988.

EXAMPLE I

This example illustrates production of a seal ring according to the invention.

Flexible graphite sheet is manufactured in the conventional manner by compressing exfoliated graphite flakes to a density of about 0.1 g/cm$^3$. The surface of the compression device is covered with a coarse cloth to emboss the surface of the sheet with uniform indentations. A powdered phenolic resin is applied to the surface of the sheet and the excess not in the indentations is removed with a squeegee. The indentations are filled with the resin, which assists in an even dispersion of the resin over the sheet surface. The resin is a phenolic resin available from Union Carbide Corporation, Danbury, Conn., under the tradename BRP-5980.

The surface is then lightly sprayed with isopropyl alcohol to partially liquefy the resin and cause the resin to penetrate into the surface. The resin is then cured by heating the sheet at a rate of 10° C./hour from 25° to 175° C. with a one-hour hold at 175° C. The sheet is then further compressed to a density of 1 g/cm$^3$ and a thickness of 16 to 17 mils (0.41 to 0.43 mm). The cured resin is then carbonized to form an amorphous carbon phase by heating in a nitrogen atmosphere at a rate of 60° C./hour from 50° C. to 520° C. with a one-hour hold at 520° C. The sheet contains about 15 wt. % amorphous carbon, based on the total weight. The sheet is then compressed to a thickness of 15 mils (0.38 mm) and a density of about 1.1 g/cm$^3$.

A seal ring is made from the sheet by cutting the sheet into strips to form tape and wrapping the tape around a shaft to produce an annular ring-shaped article with the tape arranged in a spiral fashion. The amorphous carbon surface of the strip is placed against the shaft such that the inner annular surface of the ring is the amorphous carbon surface. The article is then placed into a die mold and compressed to a density of about 1.45 g/cm$^3$ to form a seal ring.

EXAMPLE II

This example illustrates production of a seal ring of the invention with a ferric stearate lubricious material applied to the amorphous carbon surface.

Flexible graphite sheet is manufactured in the conventional manner by compressing exfoliated graphite flakes to a density of about 0.1 g/cm$^3$. The surface of the compression device is covered with a coarse cloth to emboss the surface of the sheet with uniform indentations. A powdered phenolic resin is applied to the surface of the sheet and the excess not in the indentations is removed with a squeegee. The indentations are filled with the resin, which assists in an even dispersion of the resin over the sheet surface. The resin is a phenolic resin available from Union Carbide Corporation, Danbury, Conn., under the tradename BRP-5980.

The surface is then lightly sprayed with isopropyl alcohol to partially liquefy the resin and cause the resin to penetrate into the surface. The resin is then cured by heating the sheet at a rate of 10° C./hour from 25° to 175° C. with a one-hour hold at 175° C. The sheet is then further compressed to a density of 1 g/cm$^3$ and a thickness of 16 to 17 mils (0.41 to 0.43 mm). The cured resin is then carbonized to form an amorphous carbon phase by heating in a nitrogen atmosphere at a rate of 60° C./hour from 50° C. to 520° C. with a one-hour hold at 520° C. The sheet contains about 15 wt. % amorphous carbon, based on the total weight.

Ferric stearate is applied on the surface in an amount of about 0.01 to 50, preferably about 15 wt. %, based on the weight of the sheet. The ferric stearate is applied by sprinkling the ferric stearate of the surface and heating to 100° C. to melt the ferric stearate and allow it to spread evenly over the surface of the sheet.

The graphite sheet which now has an surface with an amorphous carbon phase, the surface overlaid by a layer of ferric stearate, is compressed to a thickness of 15 mils (0.38 mm) and a density of about 1.1 g/cm$^3$.

A seal ring is made from the sheets as described in Example I.

EXAMPLE III

This example illustrates production of a seal ring of the invention with a polytetrafluoroethylene (PTFE) lubricious material applied to the amorphous carbon surface.

Flexible graphite sheet is manufactured in the conventional manner by compressing exfoliated graphite flakes to a density of about 0.1 g/cm$^3$. The surface of the compression device is covered with a coarse cloth to emboss the surface of the sheet with uniform indentations. A powdered phenolic resin is applied to the surface of the sheet and the excess not in the indentations is removed with a squeegee. The indentations are filled with the resin, which assists in an even dispersion of the resin over the sheet surface. The resin is a phenolic resin available from Union Carbide Corporation, Danbury, Conn. under the tradename BRP-5980.

The surface is then lightly sprayed with isopropyl alcohol to partially liquefy the resin and cause the resin to penetrate into the surface. The resin is then cured by heating the sheet at a rate of 10° C./hour from 25° to 175° C. with a one-hour hold at 175° C. The sheet is then further compressed to a density of 1 g/cm$^3$ and a thickness of 16 to 17 mils (0.41 to 0.43 mm). The cured resin is then carbonized to form an amorphous carbon phase by heating in a nitrogen atmosphere at a rate of 60° C./hour from 50° C. to 520° C. with a one-hour hold at 520° C. The sheet contains about 15 wt. % amorphous carbon, based on the total weight.

PTFE is applied as a dispersion in water, (available as Teflon ® T30 from DuPont de Nemours, Wilmington, Del.) by spraying the dispersion upon the surface in an amount of 0.1 to 50, preferably 5 wt. % PTFE, based upon the total weight of the PTFE and article. The sprayed article is then quickly heated to 500° F. (260° C.) to fuse the PTFE.

The graphite sheet which now has an surface with an amorphous carbon phase, the surface overlaid by a layer of PTFE, is compressed to a thickness of 15 mils (0.38 mm) and a density of about 1.1 g/cm$^3$.

A seal ring is made from the sheet as described in Example I.

EXAMPLE IV

Seal rings were produced as described in Examples I, II, and III, and tested. The ferric stearate treated rings contained 15 wt. % ferric stearate, and the PTFE treated rings contained 5 wt. % PTFE. Comparative seal rings were made by wrapping tapes cut from untreated conventional flexible graphite sheet (density 1.4 g/cm$^3$) around a shaft and compressing in a die as described in Example I.

The rings were tested upon a test fixture comprising a stuffing box, stem, and stem actuator combination of a conventional valve. Instead of a complete valve assembly, the combination is attached to a pressure vessel. The pressure vessel was pressurized to 750 psig (5.7 MPa gauge) with dry nitrogen gas, and the actuator cycled the stem back and forth through the packing from one end of the stem, with the other end of the stem in the pressure vessel. The packing comprised six rings installed in the stuffing box in the conventional manner. The dimensions of the rings were; outside diameter, 1 ⅝ inside diameter 1 ⅛ inches; and thickness, ¼ inch (41.3 mm × 28.6 mm × 6.4 mm). Each test was run for 5000 cycles over about a five hour period. During each test, any chatter, squeaking noise, or leakage around the stem was observed. The results are summarized in Table A.

TABLE A

| Seal Ring Chatter Properties | |
|---|---|
| Seal Ring | Observation |
| Comparative | Very Bad Chatter |
| Amorphous Carbon (AC) Surface | Slight Chatter |
| AC Surface with Ferric Stearate | No Chatter |
| AC Surface with PTFE | No Chatter |

The above results demonstrate the dramatic chatter reduction that can be achieved by practice of the invention.

EXAMPLE V

Flexible graphite seal rings with surfaces of various compositions were produced and tested for chatter reduction. The surface materials were chosen from materials generally recognized as having a lubricious surface. The seal rings were dimensioned as in Example IV and tested as in Example IV for chatter. The surface material and the results of the tests are shown in Table B. The ZnCl/BN and pyrolytic graphite surfaced rings (A and B) were formed by pressing powders into the surface of a flexible graphite sheet and forming seal rings by wrapping strips of the sheet around a shaft and compressing into seal rings as previously described.

Composite coated rings (C, D, and E) were formed by applying a paste of a phenolic thermosetting resin binder and a filler of carbon fibers, coke flour, or lampblack upon the surface of a flexible graphite sheet, and carbonizing the resin. The resulting surface comprised discrete carbon particles bound together and to the surface of the sheet by the carbonized phenolic binder, with negligible penetration of amorphous carbon into the interior of the sheet. Strips of the sheet were then wound around a shaft and compressed into seal rings as previously described.

TABLE B

| Comparative Seal Ring Surfaces | | |
|---|---|---|
| Ring | Surface Material | Observation |
| A | Zinc Chloride & Boron Nitride | Very Bad Chatter |
| B | Pyrolytic Graphite | Very Bad Chatter |
| C | Carbon Fibers | Very Bad Chatter |
| D | Coke Flour | Very Bad Chatter |
| E | Lampblack | Very Bad Chatter |

In summary, chatter reduction by the tested seal rings was negligible or nonexistent. In addition to the very bad chatter, the seal ring with ZnCl/BN surface (A) caused corrosion on the stem, and the seal ring with the coke flour surface (D) leaked during the test.

This test demonstrates, that even when surfaces that would be expected to be low friction surfaces are applied to seal rings, there is little or no reduction in the chatter.

While this invention has been described with reference to certain specific embodiments and examples, it is recognized by those skilled in the art that many variations are possible without departing from the scope and spirit of the invention, and that the invention, as described by the claims, is intended to cover all changes and modifications which do not depart from the spirit of the invention.

What is claimed is:

1. A method for manufacturing a flexible graphite article for use as a seal comprising:
   (a) compressing exfoliated graphite flakes into an article having a density between 0.05 g/cm$^3$ and 2.0 g/cm$^3$;
   (b) applying a material composed of coke forming organic constituents upon a predetermined surface of said sheet; and
   (c) subjecting the article to a temperature sufficient to carbonize said coke forming organic constituents to form a continuous amorphous carbon phase extending from said predetermined surface of the article only partially into the interior of said sheet.

2. The method of claim 1 wherein in step (a) the exfoliated graphic flakes are compressed to a density between 0.05 g/cm$^3$ and 1.5 g/cm$^3$.

3. The method of claim 1 wherein in step (a) the exfoliated graphic flakes are compressed to a density between 0.1 g/cm$^3$ and 0.5 g/cm$^3$.

4. The method of claim 1 wherein the article is further compressed to a density between 0.5 g/cm$^3$ and 2.0 g/cm$^3$ after step (c).

5. The method of claim 1 wherein the article is further compressed to a density between 0.8 g/cm$^3$ and 1.5 g/cm$^3$ after step (c).

6. The method of claim 1 additionally comprising the step of (d) applying a lubricious material upon the surface with the amorphous carbon phase.

7. The method of claim 6 wherein the lubricious material is an organic lubricant.

8. The method of claim 7 wherein the organic lubricant is hydroxyl-containing.

9. The method of claim 6 wherein the lubricious material is chosen from the group consisting of long chain alcohols, fatty acids, iron derivatives of fatty acids, polyethers, polyethylene glycols, silicone oils, and fluorinated hydrocarbon polymers.

10. The method of claim 6 wherein the lubricious material is ferric stearate.

11. The method of claim 6 wherein the lubricious material is polytetrafluoroethylene.

12. A flexible annular-shaped seal ring adapted to provide a seal around a moving shaft comprising a thin resilient sheet of compressed exfoliated flakes of graphite having a density between 0.05 g/cm$^3$ and 2.0 g/cm$^3$ and a thin layer comprised substantially or entirely of carbonized resinous organic material defined by a continuous amorphous carbon phase extending from a predetermined surface of said sheet only partially into the interior of said sheet for directly engaging said shaft to form a compressible seal.

13. The seal ring of claim 12 wherein the seal ring comprises between 0.1 and 75 weight percent of the amorphous carbon phase, based on the total weight of the ring.

14. The seal ring of claim 12 wherein the seal ring comprises between 10 and 25 weight percent of the amorphous carbon phase, based on the total weight of the ring.

15. The seal ring of claim 12 wherein the density of the seal ring is between 0.5 g/cm$^3$ and 2.0. g/cm$^3$.

16. The seal ring of claim 12 wherein the density of the seal ring is between 0.8 g/cm$^3$ and 1.6 g/cm$^3$.

17. The seal ring of claim 12 wherein a lubricious material is present upon the inner cylindrical surface.

18. The seal ring of claim 17 wherein the lubricious material is chosen from the group consisting of long chain alcohols, fatty acids, iron derivatives of fatty acids, polyethers, polyethylene glycols, silicone oils, and fluorinated hydrocarbon polymers.

19. The seal ring of claim 18 wherein the lubricious material is ferric stearate.

20. The seal ring of claim 18 wherein the lubricious material is polytetrafluoroethylene.

21. The seal ring of claim 12 wherein the lubricious material is an organic lubricant.

22. The seal ring of claim 21 wherein the lubricious material is hydroxyl-containing.

23. A seal adapted to prevent fluid leakage through the clearance between a stem and the edge of an aperture where the stem passes through the aperture in a wall which comprises:
   (a) container means disposed upon the wall and around the shaft and around the aperture in the wall;
   (b) at least one annual-shaped seal ring comprising flexible graphite, the seal ring having a inner cylindrical surface adjacent to the stem with a cured coating comprised of carbonized resinous organic material having a continuous amorphous carbon phase extending from said surface only partially into the interior of the seal ring; and
   (c) compression means for compressing the seal ring in the direction of the stem axis to cause the carbonized coating on the inner cylindrical surface of the seal ring to bear against the stem surface to provide a seal.

24. A method for manufacturing a flexible graphite seal ring having an inner cylindrical surface adapted to provide a seal around a stem with a continuous amorphous carbon phase upon the inner cylindrical surface extending from said surface only partially into the interior of the seal ring, the method comprising:
   (a) compressing exfoliated graphite flakes into an article having a density between 0.05 g/cm$^3$ and 2.0 g/cm$^3$;
   (b) applying a material composed of coke forming organic constituents upon at least one surface of the sheet; and
   (c) subjecting the sheet to a temperature sufficient to carbonize said coke forming organic constituents to form said amorphous carbon phase extending from the surface of the sheet only partially into the interior of said sheet;
   (d) wrapping the sheet about a shaft to form an annular shaped article with a portion of the amorphous carbon surface adjacent to the shaft; and
   (e) compressing the annular shaped article to form an annular shaped seal ring with an inner cylindrical surface adapted to provide a seal around a stem, the inner surface having an amorphous carbon phase.

25. The method of claim 24 wherein the annular shaped article is compressed in (e) to form a seal ring with a density between 1.3 g/cm$^3$ and 1.6 g/cm$^3$.

* * * * *

UNITED STATES PATENT AND TRADEMARK OFFICE
CERTIFICATE OF CORRECTION

PATENT NO. : 5,228,701

DATED : July 20, 1993

INVENTOR(S) : R.A. GREINKE ET AL

It is certified that error appears in the above-identified patent and that said Letters Patent is hereby corrected as shown below:

Col. 1, line 50, change "such as water. Petro-" to --such as water, petro- --
Col. 2, line 20, after "preferably" delete "$g/cm^3$"
Col. 9, line 26, after "in" insert --Example I.--
Col. 9, line 28, delete "Example I."

Col. 10, line 45, delete "an"
Col. 10, line 46, change "article" to --a thin sheet--
Col. 11, line 44, change "chosen" to --selected--
Col. 12, line 30, delete "an"
Col. 12, line 31, change "article" to --a thin sheet--
Col. 12, line 35, delete "and"

Signed and Sealed this

Fifth Day of April, 1994

Attest:

BRUCE LEHMAN

Attesting Officer     Commissioner of Patents and Trademarks